April 20, 1943. J. A. RYDMARK 2,317,338
TURBINE BLADE FASTENING APPARATUS
Filed Feb. 7, 1942
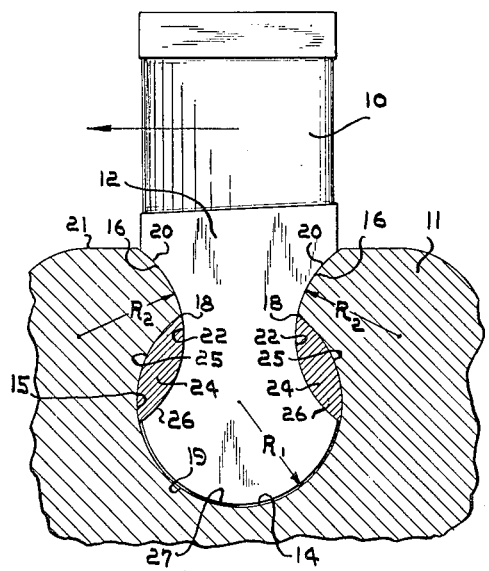
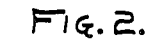
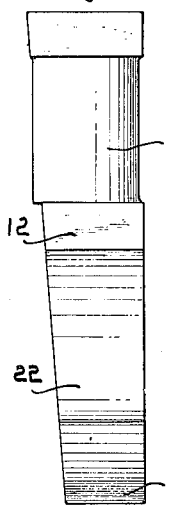
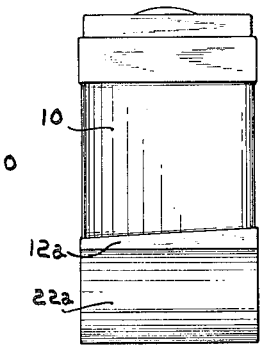
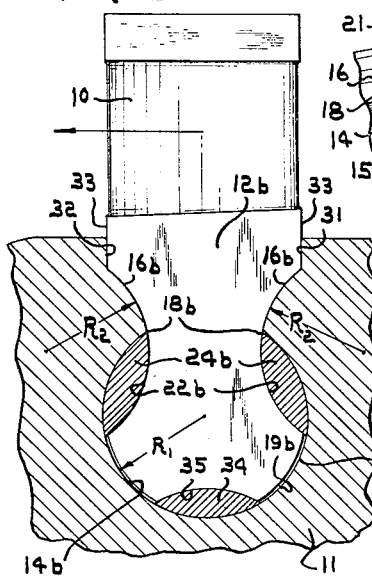
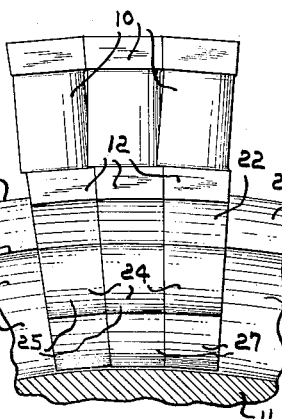
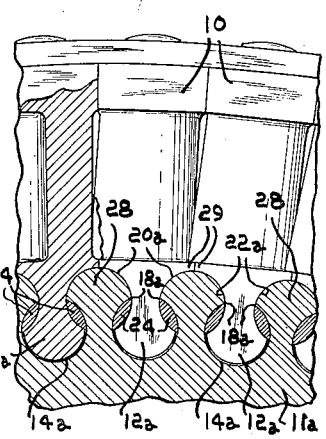
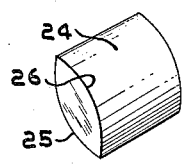
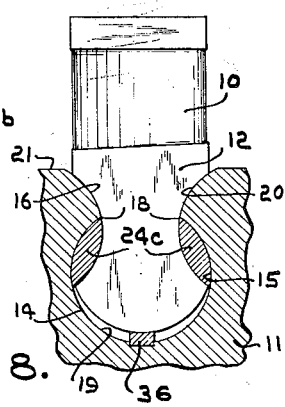
INVENTOR
JOSEF A. RYDMARK.
BY
ATTORNEY Patented Apr. 20, 1943

2,317,338

UNITED STATES PATENT OFFICE 2,317,338

TURBINE BLADE FASTENING APPARATUS

Josef A. Rydmark, Lansdowne, Pa., assignor to Westinghouse Electric & Manufacturing Company, East Pittsburgh, Pa., a corporation of Pennsylvania Application February 7, 1942, Serial No. 429,885

12 Claims. (Cl. 253—77)

The invention relates to a turbine rotor equipped with blades and it has for an object to provide a blade root construction which shall be effective to secure reduced stresses therein and a better distribution of load.

The T-type of connection is commonly employed between a rotor and blades carried thereby. With this type of connection, high or concentrated corner stresses may be encountered; and instead of the load being carried in a distributed manner by the structure, the entire load may be carried by limited regions thereof. A further object of the invention is to meet these difficulties by an improved rotor groove and blade root arrangement. The rotor groove is provided with inner and outer portions. The inner portion has opposed edges joined by a concave face of uniform radius and the edges are spaced apart a distance less than twice such radius and the outer portion is defined by opposed convex faces converging inwardly to said edges. Each of the blades has a root provided with opposed concave faces whose outer sections fit said convex faces of the outer portion of the groove and whose inner sections are in opposed relation with respect to section of the concave face of the inner groove portion adjoining said edges. Spacing pieces are interposed between said opposed sections and have convex faces fitting the latter. With this arrangement, as the blade root concave faces have the same radius as the groove convex faces and as the spacing pieces have convex faces fitting the root concave faces and the concave face of the inner portion of the groove, it will be apparent that the load imposed on a blade will be carried by the structure in a distributed manner, the root and the spacing pieces being capable of slight movement or adjustment to assure of this result. Furthermore, as centrifugal force is resisted by structure cooperating with the concave faces of each blade root, it will be apparent that, as there is an absence of corners to provide the resisting structure, tension stresses will be well distributed throughout the root without concentration thereof or overstressing at any point, as would be the case with the ordinary blade root having corners.

These and other objects are effected by the invention as will be apparent from the following description and claims taken in accordance with the accompanying drawing, forming a part of this application, in which:

Fig. 1 is a detail transverse sectional view showing the improved rotor and blade connection;

Fig. 2 is a side elevational view of a blade of the type shown in Fig. 1;

Fig. 3 is a fragmentary view of adjoining blades shown in side elevation with the cooperating rotor structure shown in section;

Fig. 4 is a side elevational view of a blade having a side entry root;

Fig. 5 is a view similar to Fig. 3 but provided with the blades of the type shown in Fig. 4;

Fig. 6 is a view similar to Fig. 1 but showing a modified form of root connection;

Fig. 7 is an isometric view showing one of the spacing or packing pieces; and,

Fig. 8 is a view similar to Fig. 1 but showing a further modified form.

Referring to Figs. 1, 2, and 3, the blades 10 are carried by the rotor 11. Each blade has a root portion 12 and the rotor is provided with a groove, at 14, for the root portion.

The groove, at 14, comprises an inner portion 15 and an outer portion 16. The inner portion 15 has opposed edges 18 joined by a concave face 19 of uniform radius $R_1$ and the edges are spaced apart a distance less than twice such radius. The outer portion 16 of each groove is defined by convex faces 20, of radius $R_2$ and which converge inwardly from the rotor peripheral surface 21 to the opposed edges 18.

The root portion 12 of each blade is provided with opposed concave faces 22 whose outer sections fit the convex faces 20 of radius $R_2$ and whose inner sections are in opposed relation with respect to sections of the concave faces 19 adjoining the edges 18.

Spacing or packing pieces 24 are interposed between the opposed sections of the concave faces of the root and the groove and fit the latter, each packing piece being defined by intersecting convex faces 25 and 26 fitting the opposed sections of the concave faces 22 and the sections of the concave face 19 adjacent to the edges 18.

As the concave faces 22 of each root have the same radius as the convex faces 20, the outer portions of the former mate with the latter when the root is in assembled position, and this relation is maintained by the spacing or packing pieces 24. While the spacing or packing pieces 24 may be made of material having approximately the same degree of hardness as that of the rotor and of the blades, I prefer to make these pieces of softer steel so as to give to the structure a resilient damping characteristic.

Preferably, the radius $R_2$ of the convex faces 20 is equal to the radius $R_1$ of the inner or concave portion 19 of the groove. Also, each blade root 12 has a convex bottom surface 27 whose radius is only slightly less than that of the groove radius R₁.

Standard undercut groove practice is followed in assembling the row of blades shown in Fig. 3, the blades being assembled one by one to form the row by inserting the roots thereof through a suitable filling opening (not shown). After each blade is moved around to one end of the row being formed, the packing pieces 24 for the root of such blade are inserted.

While, in Figs. 1, 2, and 3, the rotor 11 is shown as having a circumferentially-extending blade groove for a row of blades, in Figs. 4 and 5 there is shown a modification wherein the rotor 11a has a plurality of transversely-extending grooves 14a for blade roots 12a which, in relation to the blades proper, are positioned 90° from those shown in Figs. 1 and 2 to provide for side entry. Other than these features providing for the direction of attachment being transverse rather than circumferential, the component features of Figs. 4 and 5 are the same as those already described; however, as successive transverse grooves 14a are separated by radially-projecting portions 28, the latter have convex faces 20a which are continuous from the edge 18a of one groove to the edge 18a of the next and the blade roots are provided with contacting shoulders 29 having portions of the concave faces 22a.

In the structures so far described, the length of each spacing or packing piece 24 is determined by the thickness of each blade root, there being a pair of such spacing or packing pieces for each root. If the spacing or packing pieces are longer, that is, if one pair of such pieces extends over several blades, then, as shown in Fig. 6, additional holding and supporting features should be employed. The rotor groove at 14b, in addition to the inner portion 15b and an intermediate portion 16b, has an outer guide portion 31 whose parallel faces 32 cooperate with the parallel faces 33 of the root 12b. In addition to the spacing or packing pieces 24b interposed between opposed sections of the concave faces 22b of the blade root and of the concave surface 19b of the inner portion of the blade groove adjacent to the corners 18b, a caulking 34 is interposed between the bottom concavity 35 formed in the blade root 12b and the bottom section of the concave groove surface 19b.

In operation, each root with its cooperating pair of packing pieces is capable of adjustment in order that load applied to the blade, transversely in Fig. 1 or circumferentially in Fig. 5, may be distributed throughout the root structure, the root and the spacing or packing pieces 24 undergoing whatever adjustment may be required to secure this result. In addition to this matter of inherent self-accommodation provided by having packing pieces 24 which are individual to each root portion, the packing pieces, if made of softer material, may exert a damping or cushioning effect.

Referring to Fig. 1, the force acting in the direction of the arrow has the tendency to roll the blade root over the left-hand convex surface 20 and to raise itself. Therefore, both cushion pieces 24 become loaded; and if they are loose, they adjust themselves to the best position for receiving the load. Thus, with rotation of the rotor, it is assured that centrifugal force will be resisted by distribution of stress throughout the root construction without stress concentration at any region and the load will be distributed between the spacing or cushion pieces. If the various surfaces of the root and the cushion or packing pieces are all of the same radius, it will be apparent that the structure is inherently capable of adjustment in order to assure of distributed load.

In Fig. 8, there is shown an arrangement similar to Fig. 1 wherein each blade root may have an initial stress greater than that which would be due to centrifugal force at normal operating speed with the result that it is assured that the blade root will fit the rotor tightly under all conditions. To this end, the structure is assembled and the clearance between the bottom of the groove and the bottom end of the blade root is determined; and knowing this clearance, a bottom caulking piece 36 is selected having a thickness sufficiently less than the clearance to require the desired initial stress in the root if the latter is elongated to engage the corking compressively. Having selected a caulking strip of the desired thickness, then the spacing or packing pieces 24c are inserted and hammered or acted upon compressively to stretch the root until the latter tightly engages the caulking piece 36, whereupon the desired initial stress in the blade root will be established. If desired, this same procedure may be followed with the construction shown in Fig. 6, the bottom caulking piece 34 being made thin enough so that when it is engaged by the blade root due to stretching of the latter, the requisite initial stress will be created in the root, this result being brought about by compressive action exerted on the spacing or packing pieces 24b.

While the invention has been shown in several forms, it will be obvious to those skilled in the art that it is not so limited, but is susceptible of various other changes and modifications without departing from the spirit thereof, and it is desired, therefore, that only such limitations shall be placed thereupon as are specifically set forth in the appended claims.

What is claimed is:

1. In a turbine, a rotor provided with a groove having inner and outer portions; said inner portion having opposed edges joined by a concave face of uniform radius and the edges being spaced apart a distance less than twice such radius and said outer portion being defined by opposed convex faces extending inwardly to said edges; blades each having a root provided with opposed concave faces whose outer sections fit said convex faces and whose inner sections are in opposed relation with respect to sections of the concave face of the inner groove portion adjoining said edges; and spacing pieces interposed between said opposed sections and having convex faces fitting the latter.

2. The combination as claimed in claim 1 wherein the spacing pieces are made of material which is softer than that of the rotor and of the blades.

3. The combination as claimed in claim 1 wherein the convex faces of the groove and the concave faces of each blade root have the same radius.

4. The combination as claimed in claim 1 wherein the convex and concave faces of the groove and the root concave faces all have the same radius.

5. The combination as claimed in claim 1 wherein the packing pieces for each blade do not extend beyond the limits of the lengths of the root concave faces.

6. The combination as claimed in claim 1 wherein each root has a convex face joining the opposed concave faces thereof and the convex face has a radius nearly equal to that of the groove concavity.

7. In a turbine, a rotor provided with a circumferential blade groove having inner and outer portions; said inner portion having opposed edges joined by a concave face of uniform radius and the edges being spaced apart a distance less than twice such radius and said outer portion being defined by opposed convex faces which converge inwardly to said edges; blades each having a root provided with opposed concave faces whose outer sections fit said convex faces and whose inner sections are in opposed relation with respect to sections of the concave face of the inner groove portion adjoining said edges; and spacing pieces for each blade, interposed between said opposed sections, and having convex faces fitting the latter.

8. The combination as claimed in claim 7 wherein the spacing pieces are made of steel which is softer than that of the rotor and of the blades.

9. In a turbine, a rotor provided with a groove having inner, intermediate, and outer portions; said outer portion having parallel side faces, said inner portion having opposed edges joined by a concave face of uniform radius and the edges being spaced apart a distance less than twice such radius, and said intermediate portion being defined by opposed convex faces which converge inwardly from the inner edges of said parallel faces to said opposed edges; blades each having a root provided with outer opposed parallel faces and opposed concave faces; said foot parallel side faces engaging and fitting between the parallel faces of the outer portion of the groove, the opposed concave faces of the root having their outer sections fitting said convex faces and their inner sections in opposed relation with respect to sections of the concave face of the inner portion of the groove adjoining said edges; spacing pieces interposed between said opposed sections and having convex faces fitting the latter; and caulking means disposed between the bottom of the groove and the blade roots.

10. In a turbine, a rotor provided with a groove having inner, intermediate, and outer portions; said outer portion having parallel side faces, said inner portion having opposed edges joined by a concave face of uniform radius and the edges being spaced apart a distance less than twice such radius, and said intermediate portion being defined by opposed convex faces which converge inwardly from the inner edges of said parallel faces to said opposed edges; blades each having a root defined by opposed parallel faces joined by opposed concave faces to convex faces connected by a bottom concave face; said root parallel faces engaging the parallel faces of the outer portion of the groove, the opposed concave faces of the root having their outer sections fitting said convex faces and their inner sections in opposed relation with respect to sections of the groove concave face adjoining said edges to provide spaces and said root bottom concave faces being in opposed relation with respect to the bottom section of the concave face of the groove to define spaces; and spacing pieces disposed in said spaces and having opposed convex faces conjugate to the concave faces defining the spaces.

11. The combination as claimed in claim 10 wherein the groove convex and concave faces and the root concave faces all have the same radius.

12. In a turbine, a rotor disk provided with transverse grooves and each groove having inner and outer portions; said inner portion having opposed edges joined by a concave face of uniform radius and the edges being spaced apart a distance less than twice such radius and said outer portion being defined by opposed convex faces converging inwardly to said edges; blades each having a root provided with opposed concave faces whose outer sections fit said convex faces and whose inner sections are in opposed relation with respect to sections of the face of the inner groove portion adjoining said edges; and spacing pieces interposed between said opposed sections and having convex faces fitting the latter.

JOSEF A. RYDMARK.